United States Patent [19]

Williams

[11] Patent Number: 4,956,740
[45] Date of Patent: Sep. 11, 1990

[54] PROTECTION TECHNIQUE FOR SUPERCONDUCTING MAGNETS

[75] Inventor: John E. C. Williams, Wayland, Mass.

[73] Assignee: Massachusetts Institute of Technology, Cambridge, Mass.

[21] Appl. No.: 81,645

[22] Filed: Aug. 4, 1987

[51] Int. Cl.$^5$ .............................................. H02H 7/10
[52] U.S. Cl. ..................................... 361/19; 361/141; 307/306
[58] Field of Search ................ 361/19, 141; 338/325; 335/216; 307/306, 309

[56] References Cited

U.S. PATENT DOCUMENTS

| | | | |
|---|---|---|---|
| 3,929,477 | 12/1975 | Young | 96/1 R |
| 3,995,278 | 11/1976 | Young | 97/1 R X |
| 4,189,693 | 3/1980 | Satti | 335/216 |
| 4,218,668 | 8/1980 | Tada et al. | 335/216 |
| 4,271,443 | 6/1981 | Nöther | 361/19 |
| 4,271,585 | 6/1981 | Satti | 335/216 X |
| 4,277,769 | 7/1981 | Hieronymus | 335/216 |
| 4,349,853 | 9/1982 | Sato | 361/19 |
| 4,371,943 | 2/1983 | Woods et al. | 361/19 X |
| 4,375,659 | 3/1983 | Cunningham et al. | 361/141 X |
| 4,380,712 | 4/1983 | Intichar et al. | 310/52 |
| 4,385,277 | 5/1983 | Hanley | 324/309 |
| 4,393,429 | 7/1983 | Maki et al. | 361/19 |
| 4,528,532 | 7/1985 | Keim | 335/216 |
| 4,549,156 | 10/1985 | Mine et al. | 335/216 |
| 4,568,908 | 3/1986 | Laskaris et al. | 338/295 |
| 4,630,881 | 12/1986 | Kumpitsch et al. | 439/894 |
| 4,640,005 | 4/1987 | Mine et al. | 335/216 |
| 4,688,132 | 8/1987 | Dustmann | 361/141 X |
| 4,727,346 | 2/1988 | Westphal et al. | 361/19 X |
| 4,764,837 | 8/1988 | Jones | 361/141 X |

Primary Examiner—Derek S. Jennings
Attorney, Agent, or Firm—Robert F. O'Connell

[57] ABSTRACT

An electrical resistance device which comprises a resistance element and a superconducting gate element electrically connected in series therewith. The normal state resistance of the superconducting gate element is substantially greater than the resistance of the resistance element. A plurality of such devices can be used with the windings of a superconducting magnet, for example, to protect the windings thereof if the temperature of a particular winding region rises rapidly (the winding region quenches) due to operational instabilities, for example. At a quench the voltage at the winding region being quenched is applied to all the other devices at the other windings to generate heat at such devices in response to a relatively small voltage increase at the initially quenched region. Each of the other winding regions is thereby quenched and the gate elements thereof are triggered into their normal resistive states so that the current in the devices is reduced to a safe level.

6 Claims, 2 Drawing Sheets

PROTECTION TECHNIQUE FOR SUPERCONDUCTING MAGNETS

The Government has rights in this invention pursuant to Grant Number DMR-8211416 awarded by the National Science Foundation.

INTRODUCTION

This invention relates generally to superconducting magnet systems and, more particularly, to a novel technique for protecting the superconducting windings of a magnet as the temperature thereof rises rapidly due to operational instabilities.

BACKGROUND OF THE INVENTION

Superconducting magnets for storing relatively large energies are currently used in many applications. For example, superconducting magnets, storing energies of up to 10 Mjoules, are being constructed for Magnetic Resonance Imaging (MRI) systems which are now being routinely used in large numbers in clinical environments for medical imaging. A part of such an MRI system is a superconducting solenoid for generating a uniform magnetic field.

Superconducting magnets tend to be inherently unstable in that the temperature of a winding region of the magnet can rise relatively rapidly, due to a malfunction of the magnet itself or due to a cause external to the magnet. Such a temperature rise causes a quenching of that winding region, i.e., the superconducting winding goes from its superconducting state of essentially zero resistance to a finite resistive state. When such region gets hot very rapidly the stored energy within the magnet tends to become dissipated rapidly into that finite resistive region and severely damage the magnet, even in some cases causing an actual melting of the superconducting wires of the winding.

Accordingly, it is necessary to provide protection for the winding, as well as for the winding of the persistent mode switch used in conjunction with the magnet, in order to ensure safe dissipation of the stored energy in case of such an instability. Furthermore, the magnetic field of the system may have to be discharged for reasons other than a malfunction of the magnet itself. For instance, it may be desirable to discharge the magnetic field if a ferromagnetic object is drawn into the strong field region. Because superconducting magnets operate at very low temperatures, they must be thermally isolated from room temperature conditions so that, for purposes of protection or discharge, the currents in the windings thereof cannot be controlled or discharged by an external control unit and only very low currents can be introduced into the low temperature environment of the magnet.

Accordingly, protection and discharge of the magnet are often achieved by the use of heaters which are located both on the windings themselves and on the associated persistent mode switch. If an instability occurs at one particular winding or winding region of the magnet, all of the heaters used thereon are triggered into operation so as to quench all the other regions of the magnet, i.e., the stored energy dissipation does not occur only at the particular winding region where an initial quench has occurred but rather is dissipated throughout the entire magnet and damage to any particular winding region is prevented.

In order to detect such an instability, which results in a rapid quenching of the winding region where the instability occurs, it is necessary to rapidly detect the voltage which results across the winding resistance at a very early stage as the region begins to quench, i.e., when such voltage is relatively small. Otherwise, the voltage will build up so rapidly that the power dissipation may well occur before the quench can be detected and before preventive operation can be taken to avoid damage to the magnet.

Currently known techniques for providing early detection of a quench which occurs in a part of a magnet have tended to prove unsatisfactory since they have often required relatively bulky devices for such purpose, which devices cannot be easily used with the magnet structures involved and cannot be satisfactorily arranged to respond rapidly enough to offer the most effective protection for the magnet.

BRIEF SUMMARY OF THE INVENTION

In accordance with the invention, a technique has been developed for responding rapidly to small voltage increases due to undesired quenching of a part of a superconducting magnet. The technique utilizes a device which includes a combination of a resistance element which is electrically connected in series with a superconducting gate element in which the normal state resistance (i.e., the resistance when such element is not in its superconducting state) of such latter element greatly exceeds the resistance of the resistance element to which it is serially connected. Such devices are positioned at each of the windings of a multiple-winding magnet or at a plurality of winding regions of a large single winding magnet.

As a voltage is generated at an initially quenched winding, or winding region, such voltage is applied to each of the other devices at all the other windings or winding regions so as to produc relatively large heat generation in such other devices in response to the relatively small voltage increase at the initially quenched region. Accordingly, each of the devices heats up and each of the other windings or winding regions is thereby quenched.

As the voltage generated by the initially quenched region increases, the heat generated in each of the other devices would become dangerously high and could in extreme cases cause damage to the devices or to windings with which they are in contact. However, as the quenches induced by the other devices spread in the windings with which they are in contact, the gate wire elements of the devices are triggered into their normal resistive state and the current in the devices is then reduced to a safe level.

DESCRIPTION OF THE INVENTION

The invention can be described in more detail with the help of the accompanying drawings wherein FIG. 1 shows a typical circuit diagram of a multi-section superconducting magnet;

In order to understand the invention it is helpful to review the general structure and operation of a typical superconducting magnet.

Figure 1:
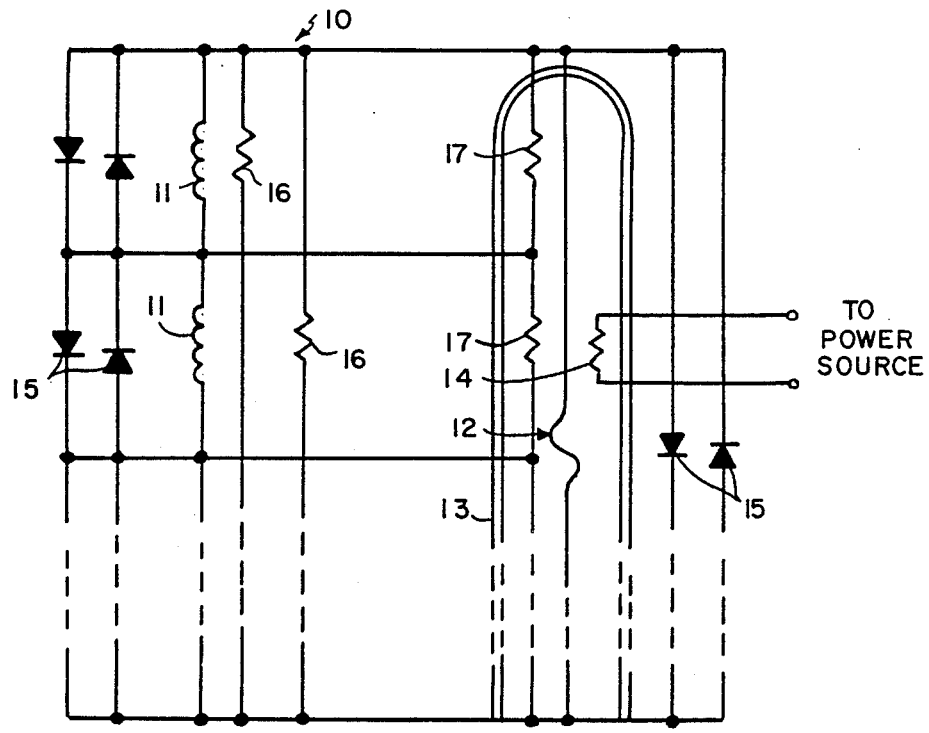

As can be seen in FIG. 1, a typical magnet 10 comprises a plurality of individual windings 11 which are connected electrically in series with each other and with a superconducting permanent mode switch 12 enclosed in a suitable housing 13, as would be well known to those in the art. Under normal superconductive operating conditions the whole of this series circuit has no resistance and current flows therein without any power loss. Alternatively, the magnet may use a single relatively large winding.

Figure 2:
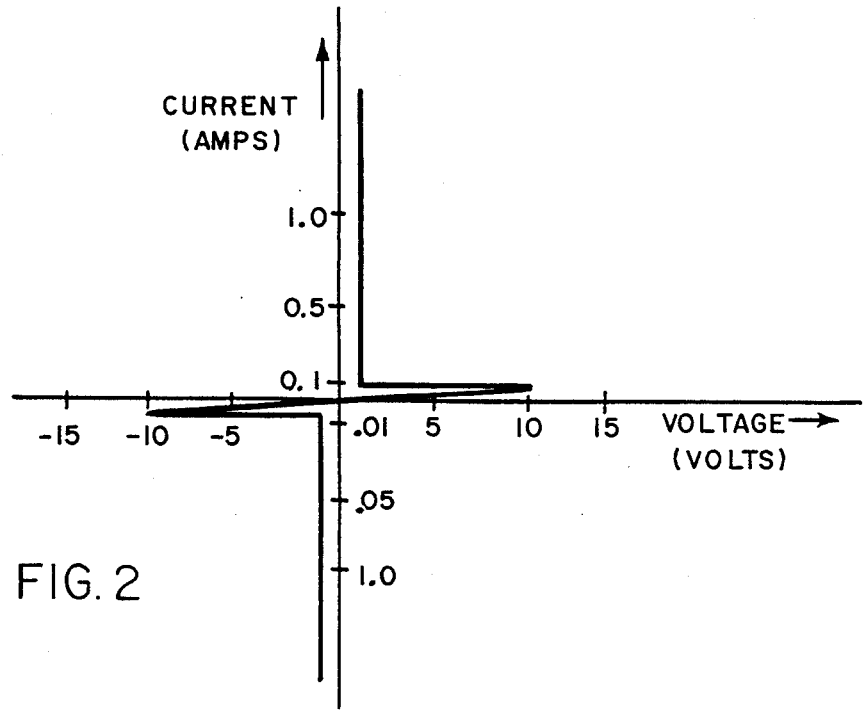
FIG. 2 shows the voltage/current characteristics of the diode pairs used in the circuit of FIG. 1.

During normal charging of the magnet, switch 12 is made resistive by the use of a heater 14 so that a voltage can be developed across the switch element 12. The diodes 15 across the windings 11 and across the switch 12 have a highly non-linear voltage-current (V/I) characteristic at low temperature. FIG. 2 shows a typical V/I characteristic of a pair of such silicon diodes at low temperature. The voltage across a diode pair can build up to a maximum of about 10 volts (V) at about 0.1 Ampere (A) after which it drops to about 1 volt. A diode pair placed across the switch will thus limit the voltage to about 1 volt for all significant currents and, hence, will limit the heat dissipation in the switch.

Two abnormal operating conditions can be considered, namely, a winding quench and a switch opening, sometimes referred to as a switch quench. If quenching occurs in a winding of relatively small volume or is confined to a relatively small region of a large winding, there is a danger that the stored energy of the system will cause excessive heat dissipation and, hence, damaging temperature and voltage conditions at such winding or winding region. To avoid that situation it is desirable that all windings, or all regions of an entire single large winding, be quenched whenever one winding, or a small region of a large winding, quenches. Such operation can be achieved in the following manner.

The voltage developed across a winding 11, for example, at an initial quench thereof drives an associated high ratio heater 17 on the permanent mode switch 12, there normally being one such high ratio switch heater 17 associated with each winding. As the switch heater 17 heats the switch 12, the switch becomes highly resistive, i.e., the switch opens, and the voltage across it rises to the saturated diode voltage drop condition, i.e., generally about 1 volt. Each winding also has a high ratio winding heater 16 associated therewith. The diode voltage across the switch then drives the high ratio heaters 16 on each of the other windings 11 which then all quench.

If a permanent mode switch quench occurs in another situation, e.g., normally due to some external actuation thereof, such a quench substantially immediately triggers the winding heaters 16 and causes each winding to quench. Such operation discharges the overall magnet system in response to such an external actuation. A switch quench can be initiated via the main switch control heater 14 which is connected to an externally switched power source (not shown) at all times. The switch heat dissipation is limited by the protective pair of diodes 15 across the switch.

Figure 3:
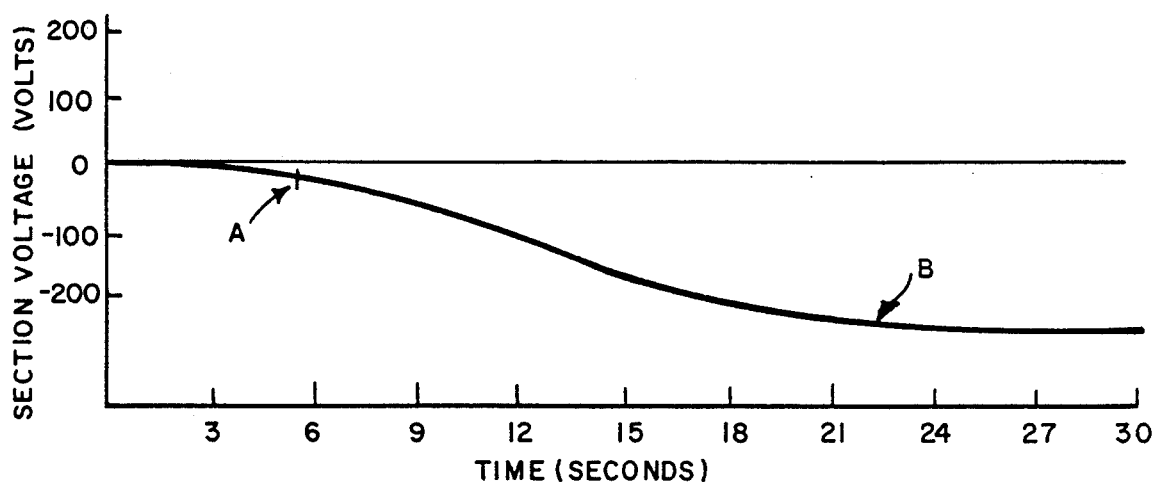
FIG. 3 shows a typical voltage change during a quench which occurs in one of the sections of the circuit of FIG. 1.

As the above discussion shows, to achieve the desired quenching operation the heaters 16 on the windings 11 and the heaters 17 on switch 12 that are energized by the winding voltages must respond quickly at low driving voltages. FIG. 3 shows a typical variation of a winding voltage as a function of time for a quench in a winding 11. It can be seen that the initial voltage rise is relatively slow but that the peak voltage is relatively large. In order for a switch heater 17 to respond quickly to such a rising voltage it must have a relatively low resistance. However, as the winding voltage rises, the power dissipation in the switch heater rises and, unless the current through the heater is somehow limited, excessive power dissipation will lead to heat damage in the heater. FIG. 3 shows that the ratio of a typical peak winding voltage at B to the initial voltage at A at which a typical heater responds is about 20 (in the figure a ratio of about 235 v. to about 11.75 v.). Thus the power dissipation in the switch heater would rise by a factor of 400.

A similar problem arises with respect to the heaters 16 on the windings 11 driven by the switch voltage. In that case, however, the excessive power dissipation arises from the combination of heat generated by the heater 16 and by the quenched winding 11 nominally in contact with it. Again, a suitable technique is required to limit the power dissipation in the heater 16 as the winding 11 quenches and the temperature rises.

One technique which has been proposed for limiting such power dissipation is to utilize, for heaters 16, heater elements formed of pure copper or pure aluminum resistors, which materials have high ratios of resistivity between room temperature and 4.2° K. At a constant voltage, however, the resistance of a copper or aluminum resistor will rise at most by a factor of about 100 between 4.2° K. and room temperature, while a factor of at least 400 is needed to match the typical voltage rise shown in FIG. 3. Furthermore, even to obtain a factor as high as 100, pure copper or aluminum resistive heaters require extremely long lengths of fine wire so that they become extremely bulky and difficult to shape in a manner so as to provide effective heater elements for a superconducting magnet. Moreover, aluminum is very difficult to fabricate as a fine wire and is mechanically weak. In general such resistors have been found not to be reliable devices for such purpose.

The invention provides a useful alternative to the use of pure copper or aluminum resistive heaters. In accordance therewith, the heaters of the invention, which can be used as the heaters 16 and 17 of FIG. 1, are in the form of a composite heater structure comprising a suitably shaped resistance heating element having a size such that the element configuration is appropriate to the object to be heated, e.g., a magnet winding. Such resistance element is electrically connected in series with a superconducting element, sometimes referred to here as a gate element, which gate element switches from essentially zero resistance to a relatively high resistance over a relatively small temperature range, e.g., between about 4.2° K. and about 8°-9° K. The composite heater formed of such elements applied to a superconducting winding to be quenched, i.e., either to a main magnet winding 11 or to a switch winding 12.

Figure 4:
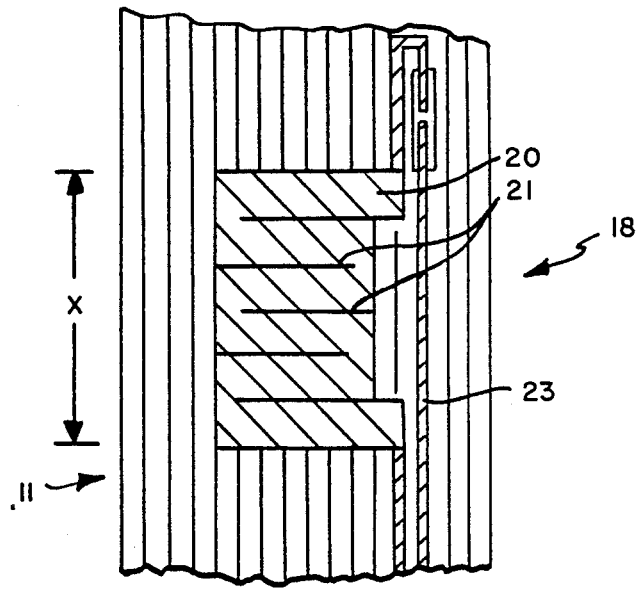
FIG. 4 shows a plan view of a device in accordance with the invention for use in the circuit of FIG. 1.
Figure 5:
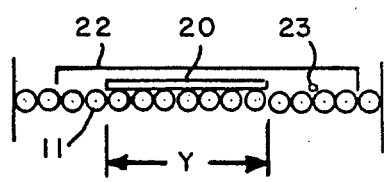
FIG. 5 shows a view in section of the device of FIG. 4.

As can be seen more specifically in FIGS. 4 and 5, a composite heating structure 18 in accordance with the invention includes a heating element 20 in the from of a substantially flat, sinuosly-shaped, stainless steel sheet, having appropriate cuts 21 therein so as to form the desired sinuous shape in order to obtain a required overall resistance, which may be, for example, between 1 to 5 ohms. Heating element 20 is thermally insulated using an insulated covering 22 (FIG. 5) so that heat generated therein can only flow into a small winding or a small section of a relatively large winding, shown as winding 11 of a superconducting magnet. Element 20 is connected electrically in series with an insulated composite superconducting gate wire element 23 (shown in section) made, for example, of nioubium-titanium filaments in a cupro-nickel matrix. The wire is encased by insulation and is bonded, by using any suitable epoxy bonding material, between two adjacent turns, for example, of winding 11, relatively close to, but not under, nor in any contact with, the heater element 20, as best seen in FIG. 5.

While heater element 20 is discussed above as being formed of stainless steel material, other materials may also be selected for such heater element so along as an adequate resistance can be obtained therefrom without the need for an excessive length thereof. In any case, the normal state resistance of the gate element 23 is selected to be much greater than the resistance of the heater element 20, i.e., preferably at least 100 times that of the heater element resistance.

The operation of the protection device which comprises resistance element 20 and gate element 23 can be explained as follows. A source voltage, as from a localized winding quench, rises across the associated localized switch heater 17 thereby causing the switch to quench and so produce a rising voltage across each of the other heaters 16. As the quench spreads to the other windings, the superconducting gate element 23 in turn quenches and its resistance changes rapidly from zero to a relatively large resistance compared to heater element 20. This prevents the rising source voltage from generating any significant further power dissipation in the heater elements associated with all of the windings. Accordingly, quenching of all of the windings of a multiple winding magnet occurs or, in the case where heaters are positioned at various regions along a single large winding of a magnet, quenching at each of such regions occurs. Power dissipation is thereby distributed throughout the magnet and no damage occurs at the specific region where a quench initially occurred.

In a typical magnet the heater element 20 may have dimensions "X" and "Y" as shown in FIGS. 4 and 5 where, for example, X is about 10 cm. and Y is about 5 cm. Gate wire element 23 may have one or a few turns, or in some cases may require only a partial turn, to produce the desired operation. Gate wire 23 is normally positioned sufficiently close to heater element 20 so as to heat up rapidly but is not positioned directly under or in direct contact with it.

Modifications to the structure of the invention may occur to those in the art within the spirit and scope of the invention. Hence, the invention is not to be construed as limited to the particular embodiment discussed above, except as defined by the appended claims.

What is claimed is:

1. An electrical resistance device for use in a superconducting magnet having at least one superconducting winding, said device including
   a resistance element positioned in thermal contact with at least a portion of a winding of said magnet; and
   a superconducting gate element in series with said resistance element and positioned in thermal contact with said magnet winding relatively close to, but not in thermal contact with, said resistance element, said gate element capable of being switched from its superconducting state to its normal resistance state to limit current in said device so as to protect said resistance element and the portion of the winding with which it is in thermal contact.

2. An electrical resistance device in accordance with claim 1 wherein said superconducting gate element is switched in response to the heating thereof.

3. An electrical resistance device in accordance with claim 2 wherein said heating occurs as a result of the quenching of said portion of said winding of said magnet.

4. An electrical resistance device for use in a superconducting magnet which includes a permanent mode switch having a superconducting switch winding said device including a resistance element positioned in thermal contact with at least a portion of said switch winding and a superconducting gate element positioned in series with said resistance element and in thermal contact with said superconducting switch winding relatively close to but not in thermal contact with, said resistance element, said gate element capable of being switched from its superconducting state to its normal resistance state to limit current in said device so as to protect said resistance element and said superconducting switch winding.

5. An electrical resistance device in accordance with claim 4 wherein said superconducting gate element is switched in response to the heating thereof.

6. An electrical resistance device in accordance with claim 5 wherein said heating occurs as a result of the quenching of said portion of said switch winding.

* * * * *